United States Patent
Burgschat

(12) 
(10) Patent No.: US 6,476,380 B1
(45) Date of Patent: Nov. 5, 2002

(54) COMPACT OPTICAL MEASURING MODULE UTILIZING THREE DIMENSIONAL CONSTRUCTION

(75) Inventor: Reiner Burgschat, Jena (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/454,384

(22) Filed: Dec. 3, 1999

(30) Foreign Application Priority Data

Dec. 3, 1998 (DE) ......................................... 198 55 828

(51) Int. Cl.$^7$ .............................................. G01B 11/00
(52) U.S. Cl. ........................... 250/231.14; 250/231.13; 356/616
(58) Field of Search ...................... 250/231.13, 231.14; 257/81; 356/614, 616

(56) References Cited

U.S. PATENT DOCUMENTS

| | | | | |
|---|---|---|---|---|
| 4,700,065 A | | 10/1987 | Kordulla et al. ........ | 250/231.14 |
| 5,283,434 A | * | 2/1994 | Ishizuka et al. ........ | 250/231.16 |
| 5,666,196 A | * | 9/1997 | Ishii et al. ................ | 356/356 |
| 5,670,781 A | * | 9/1997 | Setbacken .............. | 250/231.16 |
| 5,703,394 A | * | 12/1997 | Wei et al. ................ | 257/431 |
| 5,748,161 A | * | 5/1998 | Lebby et al. .......... | 250/231.14 |
| 5,670,781 A | * | 10/2000 | Setbacken .............. | 250/231.16 |
| 6,285,043 B1 | * | 9/2001 | Yap ............................ | 257/81 |

FOREIGN PATENT DOCUMENTS

| | | |
|---|---|---|
| DE | 197 20 300 | 12/1997 |
| DE | 198 43 155 | 4/1999 |
| EP | 0 060 021 | 2/1982 |
| EP | 0 564 683 | 4/1992 |
| EP | 0 789 228 | 1/1997 |
| EP | 0 838 665 | 10/1997 |

OTHER PUBLICATIONS

Reiner Burgschat, "New Dimensions in Position and Angle Measuring Technology", Oct. 1996, p. 752–726.

* cited by examiner

*Primary Examiner*—Stephone Allen
*Assistant Examiner*—Bradford Hill
(74) *Attorney, Agent, or Firm*—Kenyon & Kenyon

(57) ABSTRACT

A three-dimensional measuring module includes an optical chip arranged spatially above a scanning plate and a signal processing assembly arranged above the optical chip. A housing completely encloses the optical chip and the signal processing assembly as well as a scanning plate. The electrical connecting lines between the optical chip and the signal processing assembly are routed via the scanning plate and the interior side of the housing to the signal processing assembly. The output signals of the signal processing assembly are conveyed via connecting lines to contacts on the exterior side of the housing. The conductive lines between the optical chip and the signal processing assembly can be kept very short, so that line resistance and interference coupling are reduced.

14 Claims, 2 Drawing Sheets

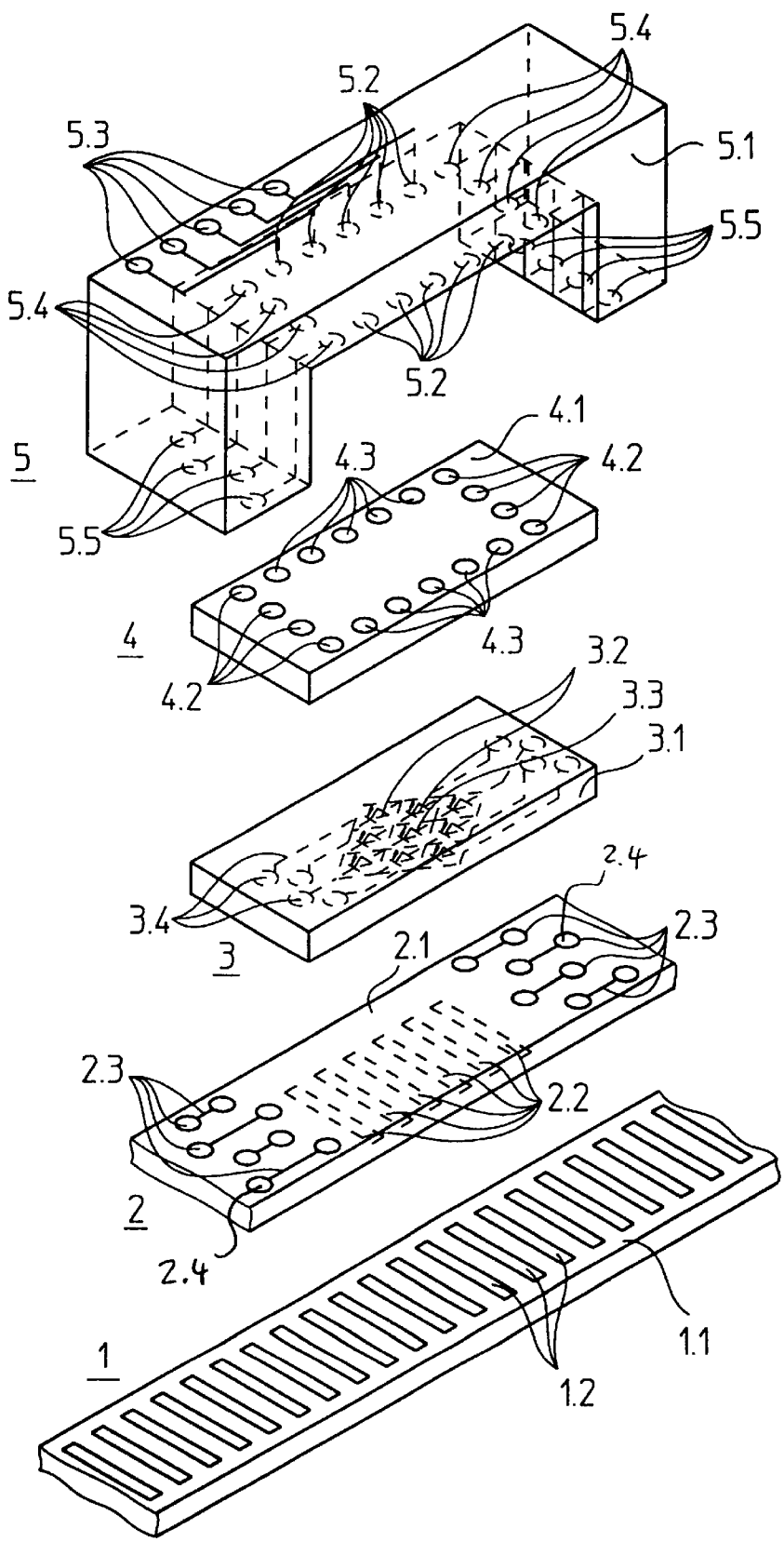

COMPACT OPTICAL MEASURING MODULE UTILIZING THREE DIMENSIONAL CONSTRUCTION

The invention relates to a three-dimensional design of a measuring module with an optoelectronic assembly and a scanning plate.

DESCRIPTION OF RELATED ART

European Patent Application 838 665 A1 describes an optical length-measuring device that is composed of a scale, a light source, and a scanning assembly having a scanning grating. The light source transmits collimated light to the scale, which supports an optical graduation. The scanning assembly detects fluctuations in brightness according to the displacement between the scale and the scanning assembly. The scanning assembly has thin-film conductors, on a glass substrate, and a light-sensitive optical chip which includes a group of light-sensitive components and the scanning grating. The scanning assembly is arranged on the other side of the scale, so that the light-sensitive optical chip receives the collimated light. The lightsensitive optical chip is mechanically secured by soldering and by an underfiller, a transparent seal that is applied between the optical chip and the glass substrate.

One disadvantageous aspect of this system is that the circuits applied to the glass substrate of the scanning assembly require a large surface, as a result of which relatively long printed circuit traces are required, in particular for connecting to a signal processing unit.

European Patent Application 564 683 A1 describes an optoelectronic position-, angle-, or rotation measuring device. The device has an illuminated or transparent code carrier having at least one code track. Next to the code track, a diaphragm is arranged in the form of a plate having a transparent area assigned to the code track. In addition, an optoelectronic sensor is arranged on the side of the diaphragm facing away from the code carrier, the sensor having a sensor surface facing the diaphragm. On the plate-shaped diaphragm there is an optoelectronic semiconductor chip used as a sensor, disposed on the side facing away from the code carrier. The chip has contact points on the side facing the plate-shaped diaphragm. The plate has electrical printed circuit traces corresponding to these contact points, the printed circuit traces being connected in an electrically conductive manner to the contact points of the semiconductor chip via soldering points. Using a molding compound, for example, the semiconductor chip can be also stabilized mechanically.

This system also has the disadvantage that the sensor, including the necessary evaluation electronics, requires a relatively large amount of space, and therefore long printed circuit traces are necessary.

German Patent Application 197 20 300 A1 discloses an electronic hybrid component and a method for manufacturing it. In this component, at least one cavity is introduced, using a chip-on-chip arrangement, in a substrate that constitutes the first chip. An electrical insulating layer, having a metal layer arranged on top of it, is applied to the cavity. A second chip arranged in the cavity in the form of a light-emitting diode is conductively connected to the metal layer and extends out of the cavity, beyond the first chip, by at most a very small amount. The cavities in the first chip are generated using anisotropic etching. The insulation is obtained through oxidation of the surface of the first chip or through the deposition of an insulating layer. The metallization can contain a multiple metallization system and can be patterned using a photolithographic process. The second chip, arranged in the cavity, contacts the metallization thus generated in the cavity and is also brought into contact with the first chip on the reverse side.

This hybrid component has the disadvantage that the cavity and its layers, as well as the contacting between the two chips, can only be made in a relatively complicated fashion. Furthermore, it is not described in the reference how it would be possible, using a chip-on-chip arrangement, to optimize a measuring module so as to make a compact length- or angle-measuring system.

The article "New Dimensions in Position and Angle Measuring Technology," by Reiner Burgschat, in F & M Feinwerktechnik, Mikrotechnik, Mikroelektronik (Precision Engineering, Microtechnology, Microelectronics), October 1996, p. 752–756, describes a measuring module formed in a single-plane circuit on a glass substrate. The light-emitting diodes necessary for a measuring system are applied and contacted on the surface of an optical chip such that they emit a beam through the glass substrate. The optical chip has a photo diode array that is soldered onto the glass substrate using flip-chip technology, and that detects the beam passing through the glass substrate. To connect the individual components, a printed circuit trace pattern is applied on the glass substrate connecting the optical chip components to the electronic signal conditioning. In addition, the glass substrate also has a scanning graduation. An underfiller is applied between the optical chip having the photo diode array and both the light-emitting diodes and the glass substrate to improve mechanical stability. To protect this measuring module, a ceramic cap is secured over the assemblies applied to the glass substrate.

A disadvantageous feature of this system is that the entire circuit is formed in one plane, which makes a relatively large glass substrate necessary and results in long printed circuit traces on the glass substrate. The sensitivity to interfering emissions is increased, and the electrical resistance of the traces is high. Furthermore, the underfiller can reach the beam path between the light-emitting diode, the scanning grating, the scale, and the photo diode array, detracting from the optical properties of the arrangement.

European Patent Application 060 021 A2 describes arranging an optoelectronic assembly on a printed circuit board over a scanning pattern of a rotary transducer. On the other side of the printed circuit board, additional assemblies are arranged for signal processing.

A disadvantage of this system is that the assemblies are separated by a printed circuit board, which necessarily results in a relatively large overall height of the optoelectronic assemblies, printed circuit board, and signal processing unit, which are arranged in three-dimensional fashion one over the other.

European Patent Application 789 228 A2 describes how to arrange printed circuit traces on a transparent substrate, creating a connection between a printed circuit board and an optoelectronic assembly. The connecting points between the printed circuit traces of the printed circuit board, the transparent substrate, and the optoelectronic assembly are also used for mechanically fixing in position the transparent substrate and the optoelectronic assembly.

This device has the disadvantage that the arrangement achieves only slight mechanical stability. Although it is necessary to achieve the most exact possible orientation of the optoelectronic assembly with respect to the transparent substrate and the printed circuit board, a change in the arrangement, such as the separation of a printed circuit trace, can be caused even by minor mechanical shocks.

SUMMARY OF THE INVENTION

The present invention is thus a circuit arrangement for a measuring module, composed of an optical unit and signal processing electronics, that can be assembled in a very small design, so that the lengths of the electrical printed circuit traces are as short as possible, in particular between the optical sensor and the evaluation electronics. In addition, the necessity for mechanical stabilization through the use of an underfiller is substantially eliminated in this design.

In one embodiment, the invention is a three-dimensional measuring module, that includes a scanning plate, an optoelectronic assembly disposed over the scanning plate, a signal processing unit disposed over the optoelectronic assembly, and a protective cap cooperating with the scanning plate to substantially enclose the optoelectronic assembly and the signal processing unit.

The method according to the invention has the advantage that due to the three-dimensional arrangement of optical unit and signal processing electronics, located one over the other, the connecting printed circuit traces can be kept very short. In this manner, the electrical resistances of the printed circuit traces are small, so that even a weak output signal of the optical sensor can still be recognized without error by the signal processing electronics. Furthermore, another advantage is that the sensitivity to interfering emissions, which above all are received through long printed circuit traces which act as antennas for the interfering emissions, is significantly less due to the fact that the printed circuit traces between the optical sensor and the signal processing electronics are very short.

BRIEF DESCRIPTION OF THE DRAWINGS

Details and further advantages of the invention are explained in greater detail below on the basis of the embodiment depicted.

In the Drawings:

FIG. 2 shows an exploded perspective view of the measuring system shown in FIG. 1, according to the invention.

DETAILED DESCRIPTION OF THE PREFERRED EMBODIMENTS OF THE INVENTION

Figure 1:
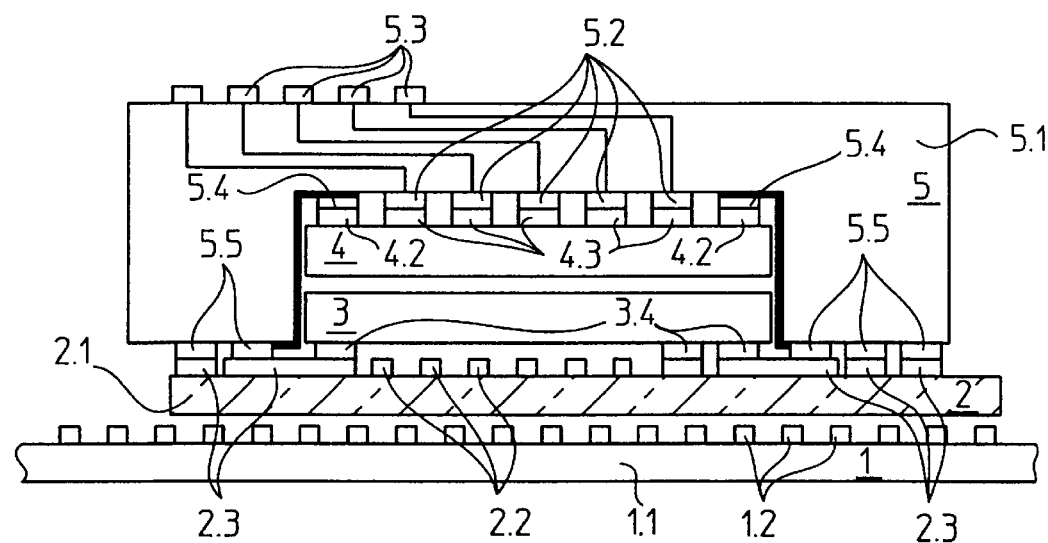
FIG. 1 shows a cross-sectional view of one embodiment of a measuring system according to the invention.

In a preferred embodiment of the invention, the three-dimensional measuring module of the invention is employed in a length measuring system. However, it should be clear that the measuring module could be used in an angle measuring system by simply exchanging the scale, without other changes to the three-dimensional measuring system.

FIG. 1 depicts a vertical cutaway view of a measuring system using the three-dimensional measuring module of the invention. Scale 1 of the measuring system is composed of a carrier body 1.1, onto which a graduation 1.2 has been applied. Scale 1 reflects the light striking the graduation marks 1.2 and the interstitial spaces in different ways, so that a diffraction effect arises at graduation 1.2 of scale 1 and at graduation 2.2 of scanning plate 2.

Scanning plate 2 has a carrier body 2.1 made of transparent material, preferably glass, and supports a graduation 2.2 on either the side facing towards or facing away from the scale. In addition, printed circuit traces 2.3 and contacts 2.4 are arranged on carrier body 2.1 of scanning plate 2. Contacts 2.4 are arranged in the vicinity of scanning graduation 2.2 contacting contacts 3.4 of an optical chip 3, and printed circuit traces 2.3 connecting these contacts to contacts 2.4 are located further to the outside on scanning plate 2. Contacts 2.4 in turn connect to contacts 5.5 of a housing 5.

As depicted in FIG. 2 in greater detail, optical chip 3 has a diode array having at least one photo diode 3.2 and at least one light-emitting diode 3.3. Diodes 3.2 and 3.3 are oriented such that light-emitting diodes 3.3 preferably emit in the direction of scanning plate 2 and of scale 1, and photo diodes 3.2 detect the light beams of light-emitting diodes 3.3 that have penetrated scanning plate 2 and have been reflected by scale 1.

Light-emitting diodes 3.3 and photo diodes 3.2 are connected on optical chip 3 to contacts 5.5 of housing 5, via conductors and contacts 3.4, and via conductors and contacts 2.3, 2.4 of scanning plate 2. Housing 5 is preferably composed of ceramic, and it protects the entire part of the measuring module situated between scanning plate 2 and housing 5 against external influences. In the housing, contacts 5.5 are connected via electrical conductors to contacts 5.4, which provide a connection to contacts 4.2 of a signal processing unit 4. In signal processing unit 4, output signals of photo diodes 3.2 are amplified and are further processed resulting in an output signal in accordance with a standard, for example a digital output signal having 5 V TTL level. In signal processing unit 4, any known type of processing methods, but preferably digital processing, can be applied to the output signals of photo diodes 3.2.

The output signals of signal processing unit 4 are conveyed via contacts 4.3 to contacts 5.2 of housing 5, from where the output signals are conveyed via the printed circuit traces from the interior side of housing 5 to contacts 5.3 on the exterior side of housing 5. These externally situated contacts 5.3 can then be contacted, for example using conventional bonds.

The arrangement according to the present invention of optical chip 3, signal processing unit 4, and housing 5, one over the other, and the specific routing of the printed circuit traces from photo diodes 3.2 via signal processing unit 4 to external contacts 5.3, as depicted in FIG. 1, makes possible very short printed circuit traces. These short circuit traces result in the signal transmission having a particularly high quality. As a result of the protective function against mechanical stresses of housing 5 for optical chip 3 and signal processing unit 4, it becomes possible to avoid using a supplemental underfiller for the mechanical stabilization of optical chip 3. In addition, signal processing unit 4 can also be mechanically connected to housing 5 exclusively through its soldering connections 4.2 and 4.3.

In FIG. 2, the measuring system shown in FIG. 1 in a cutaway view is presented in an exploded perspective view. The same reference numerals are used for the same components in both Figures. Scale 1 supports graduation 1.2, where the two alternating regions of the graduation surface have a different reflection coefficient one from the other. These regions are referred to as framed areas and unframed areas. The difference in reflection can be due either to the fact that the intensity of the reflection is different, or that diffraction occurs at graduation 1.2.

Graduation 2.2, provided on optically transparent scanning plate 2, cooperates optically with graduation 1.2 of scale 1. The framed areas of graduation 2.2 have a different transmission behavior for the light transmitted by light-emitting diode 3.3 than the unframed areas of graduation 2.2. Graduation 2.2 of scanning plate 2 can be mounted either on the side facing, or facing away from scale 1. Furthermore, provision is made on scanning plate 2 for contacts and electrical printed circuit traces 2.3, which are used to convey an electrical signal from an optical chip 3 to contacts of a housing 5. Conductors and contacts of chip 3 are arranged such that they are not located in the emission path of a light beam coming from a light-emitting diode 3.3 of optical chip 3, as the light beam penetrates scanning plate 2 in the area of graduation 2.2, and is reflected by the scale before striking optical chip 3. Furthermore, the lengths of the electrical conductors can be selected to be as short as possible. Thus it has proven to be advantageous to arrange the conductors and contacts 2.3, 2.4 next to graduation 2.2, as is depicted in FIG. 2. Carrier body 2.1 of scanning plate 2 is transparent to the beam transmitted by light-emitting diode 3.3 of optical chip 3. Since this beam generally lies in the visible range of light, carrier body 2.1 can be preferably made of glass.

An optical chip 3 can be connected to scanning plate 2, for example by using flip-chip technology. A portion of contacts 2.4 arranged on scanning plate 2, faces complementary contacts 3.4. These contacts 3.4 are connected via conductive lines to at least one photo diode 3.2 and at least one light-emitting diode 3.3, so that light-emitting diodes 3.3 are supplied with voltage and the output signals of photo diodes 3.2 are retransmitted further via scanning plate 2.

It is advantageous if a plurality of photo diodes 3.2 are arranged to form a square which is rotated by 45 degrees of angle with respect to the surface of scanning plate 2, as is depicted in FIG. 2. At least one light-emitting diode 3.3 is arranged in the center of this square made of photo diodes 3.2. Light-emitting diode 3.3 is advantageously arranged such that the emitted light does not strike directly onto photo diodes 3.2, but rather takes a preferred direction towards scanning plate 2 and scale 1. This is obtained by placing light-emitting diode 3.3 in a recess of optical chip 3. In this way, the semiconductor substrate of optical chip 3 forms a diaphragm, which prevents the direct transmission of the light emitted by light-emitting diode 3.3 onto photo diodes 3.2.

As has already been described, the output signals of photo diodes 3.2 and the supply voltage of light-emitting diode 3.3 are routed via contacts and printed circuit traces 3.4 to contacts and printed circuit traces 2.3 of scanning plate 2, and from there are routed to contacts 5.5 of housing 5. In the housing, the routing takes place via conductors to contacts 5.4 and via the latter to contacts 4.2 of signal processing unit 4.

In signal processing unit 4, the relatively weak output signals of photo diodes 3.2 are amplified at first using a low-noise amplifier. It is important that the amplifiers be arranged as near as possible to photo diodes 3.2, since, if the printed circuit traces are long, interferences are added to the useful signal of photo diodes 3.2. The printed circuit traces act as antennas which receive electromagnetic waves that are added to the useful signal as an interference. Because of the arrangement of signal processing unit 4, located above optoelectronic assembly 3, the printed circuit traces can be kept very short, which results in having only very slight interference couplings. Furthermore, short printed circuit traces are also particularly advantageous because these result in a lower line resistance, which is not negligible in the very thin conducting lines.

The printed circuit traces according to the invention are short, and thus result in a smaller voltage drop over their length than over longer printed circuit traces. The useful signal amplitude in signal processing unit 4 is thus greater for shorter printed circuit traces than for long ones.

After the amplification in signal processing unit 4, the output signals of photo diodes 3.2 can be subjected to any further processing steps desired, in particular digital processing, until the desired output signal is fed to contacts 4.3 of signal processing unit 4. The signal processing unit itself is an assembly that includes analog and digital components. It is advantageous if the analog and digital components are combined into one single unit, such as signal processing unit 4.

Contacts 4.3 of signal processing unit 4 make contact with contacts 5.2 of housing 5, depicted in FIG. 2 without front and rear walls. Optical chip 3 and signal processing unit 4 are completely enclosed by housing 5, which is made preferably of ceramic, and by scanning plate 2. These assemblies are shielded from the outside environment, and the measuring module constitutes one unit. The only other influences on the two assemblies are gravity and mass inertia during acceleration, so that the only mechanical mounting required for these assemblies is provided by the conductive connections 4.2, 4.3, and 3.4.

Several printed circuit traces can be located in housing 5, as was already described. In particular, printed circuit traces can extend from contacts 5.2 of housing 5 to contacts 5.3, and between contacts 5.5 and 5.4. In this manner, the output signals of signal processing unit 4 are routed to the exterior of housing 5. Contact surfaces 5.3 can be used by the end user for conventional connecting technologies. Contacts 5.3 are particularly well suited for having conventional conductive lines, for example flat band cables, soldered to them.

What is claimed is:

1. A three-dimensional measuring module, comprising:
    a scanning plate;
    an optoelectronic assembly disposed over the scanning plate;
    a signal processing unit disposed over the optoelectronic assembly, the signal processing unit and the optoelectronic assembly being separate units;
    first electrical conductive lines disposed on the protective cap and on the scanning plate, said first lines connecting the optoelectronic assembly to the signal processing unit;
    second electrical conductive lines disposed in the protective cap, said second lines connecting output signal contacts of the signal processing unit to contacts disposed on an exterior portion of the protective cap; and
    a protective cap cooperating with the scanning plate to substantially enclose the optoelectronic assembly and the signal processing unit.

2. The three-dimensional measuring module as recited in claim 1, further comprising contacts on an interior side of the protective cap, connecting the second electrical conductive lines disposed in the protective cap to the output signal contacts of the signal processing unit.

3. The three-dimensional measuring module as recited in claim 1, wherein input contacts of the signal processing unit are connected by the first conductive lines to second contacts on an interior side of the protective cap, to the scanning plate, and to the optoelectronic assembly.

4. The three-dimensional measuring module as recited in claim 1, further comprising at least one photo diode and at least one light-emitting diode disposed on a side of the optoelectronic assembly facing the scanning plate.

5. The three-dimensional measuring module as recited in claim 4, wherein the side of the optoelectronic assembly facing the scanning plate comprises first optoelectronic assembly contacts cooperating with first scanning plate contacts of the scanning plate to form an electrical and a mechanical connection.

6. The three-dimensional measuring module as recited in claim 5, wherein the first scanning plate contacts are disposed to form a transparent portion of the scanning plate, said transparent portion being adapted to allow passage of a beam traveling from the at least one light-emitting diode of the optoelectronic assembly to a scale, and a reflected beam traveling from the scale to the optoelectronic assembly.

7. The three-dimensional measuring module as recited in claim 1, further comprising a low noise amplifier to amplify an input signal of the signal processing unit.

8. A three-dimensional measuring module, comprising:

a scanning plate;

an optoelectronic assembly disposed over the scanning plate;

a signal processing unit disposed over the optoelectronic assembly;

a protective cap cooperating with the scanning plate to substantially enclose the optoelectronic assembly and the signal processing unit;

first electrical conductive lines disposed on the protective cap and on the scanning plate, said first lines connecting the optoelectronic assembly to the signal processing unit; and second electrical conductive lines disposed in the protective cap, said second lines connecting output signal contacts of the signal processing unit to contacts disposed on an exterior portion of the protective cap.

9. The three-dimensional measuring module as recited in claim 8, further comprising contacts on an interior side of the protective cap, connecting the second electrical conductive lines disposed in the protective cap to the output signal contacts of the signal processing unit.

10. The three-dimensional measuring module as recited in claim 8, wherein input contacts of the signal processing unit are connected by the first conductive lines to second contacts on an interior side of the protective cap, to the scanning plate, and to the optoelectronic assembly.

11. The three-dimensional measuring module as recited in claim 8, further comprising at least one photo diode and at least one light-emitting diode disposed on a side of the optoelectronic assembly facing the scanning plate.

12. The three-dimensional measuring module as recited in claim 11, wherein the side of the optoelectronic assembly facing the scanning plate comprises first optoelectronic assembly contacts cooperating with first scanning plate contacts of the scanning plate to form an electrical and a mechanical connection.

13. The three-dimensional measuring module as recited in claim 12, wherein the first scanning plate contacts are disposed to form a transparent portion of the scanning plate, said transparent portion being adapted to allow passage of a beam traveling from the at least one light-emitting diode of the optoelectronic assembly to a scale, and a reflected beam traveling from the scale to the optoelectronic assembly.

14. The three-dimensional measuring module as recited in claim 8, further comprising a low noise amplifier to amplify an input signal of the signal processing unit.

\* \* \* \* \*

UNITED STATES PATENT AND TRADEMARK OFFICE
CERTIFICATE OF CORRECTION

PATENT NO. : 6,476,380 B1
DATED : November 5, 2002
INVENTOR(S) : Reiner Burgschat It is certified that error appears in the above-identified patent and that said Letters Patent is hereby corrected as shown below:

<u>Title page, Item [54] and Column 1, lines 1-3,</u>
Change "COMPACT OPTICAL MEASURING MODULE UTILIZING THREE DIMENSIONAL CONSTRUCTION" to -- OPTICAL MEASURING SYSTEM --.

Signed and Sealed this

Twentieth Day of May, 2003

JAMES E. ROGAN
*Director of the United States Patent and Trademark Office*